No. 743,432. PATENTED NOV. 10, 1903.
F. S. BLACKMARR & J. L. WILLFORD.
APPARATUS FOR CONVERTING OXYGEN INTO OZONE.
APPLICATION FILED APR. 26, 1902.

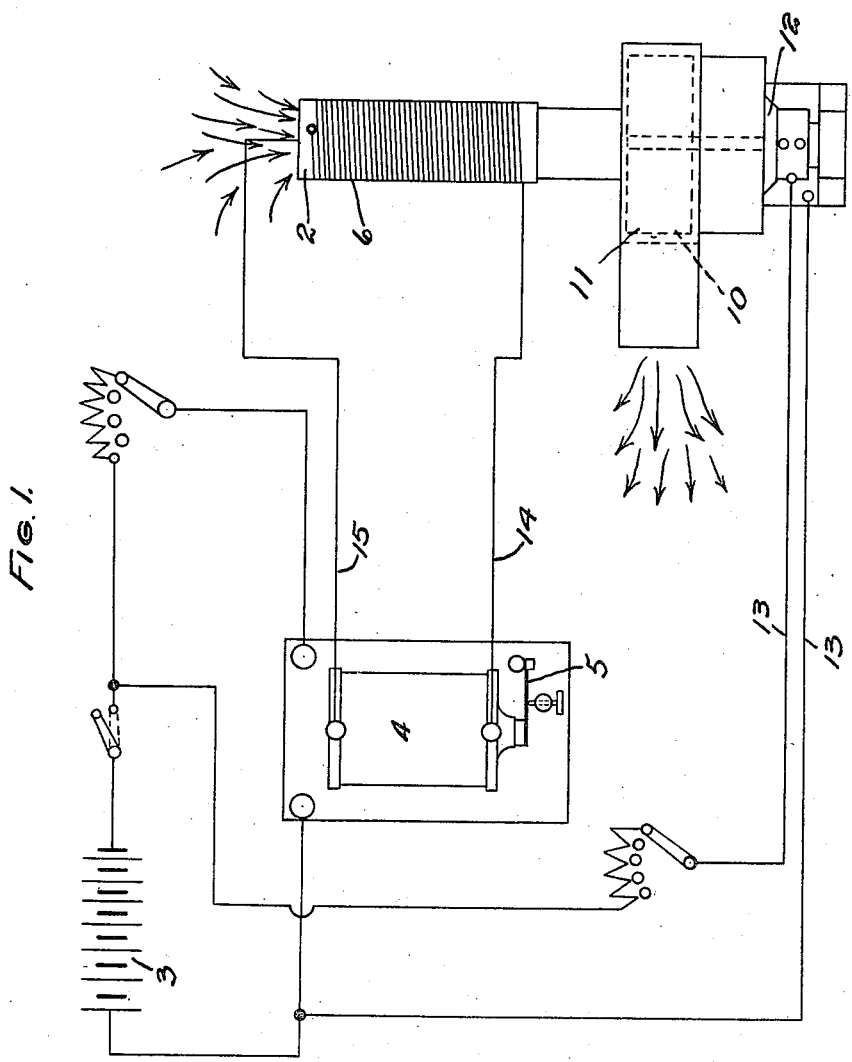

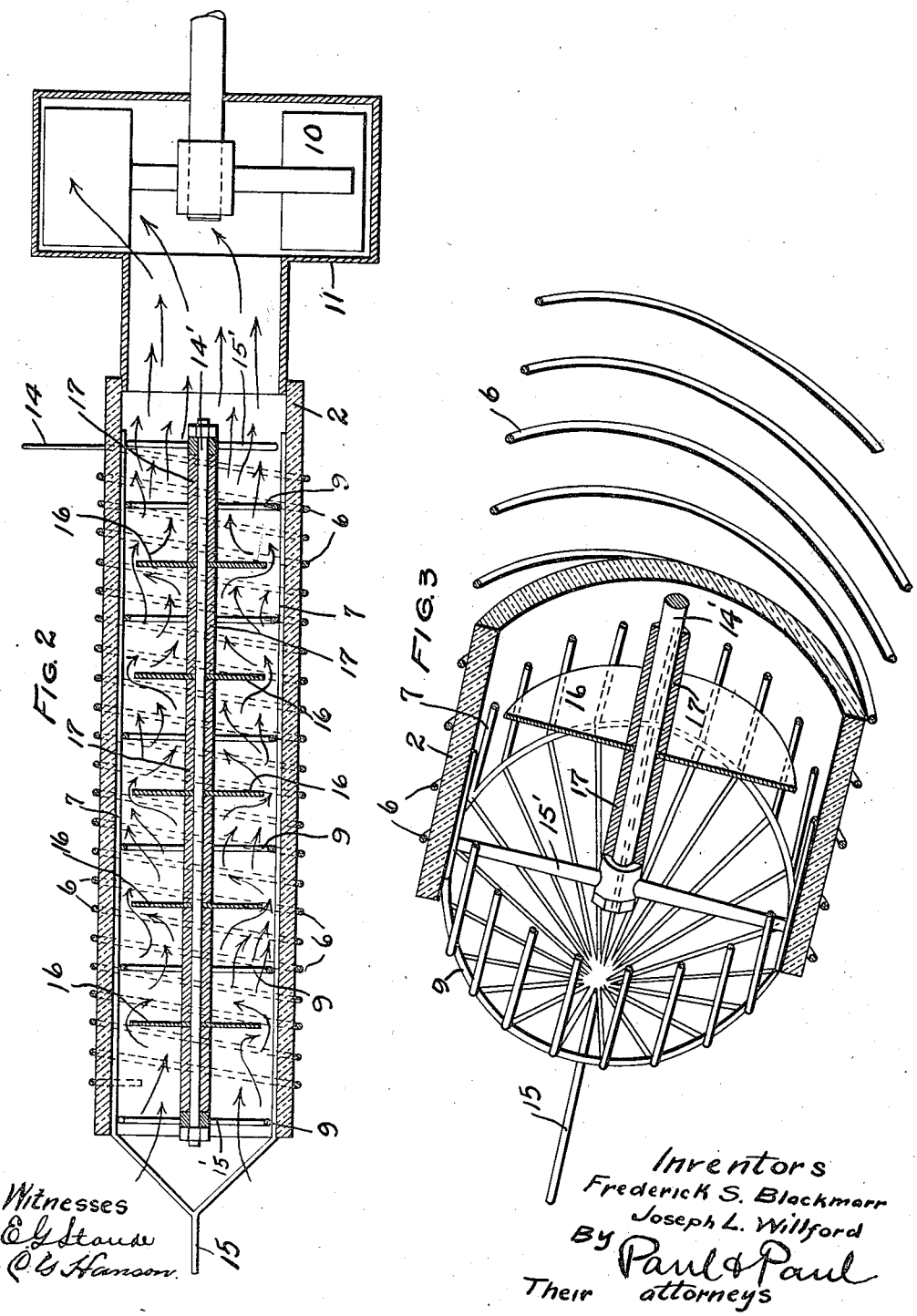

NO MODEL. 8 SHEETS—SHEET 3.

Witnesses
E. G. Staude
C. G. Hansen

Inventors
Frederick S. Blackmarr
Joseph L. Willford
By Paul & Paul
Their attorneys

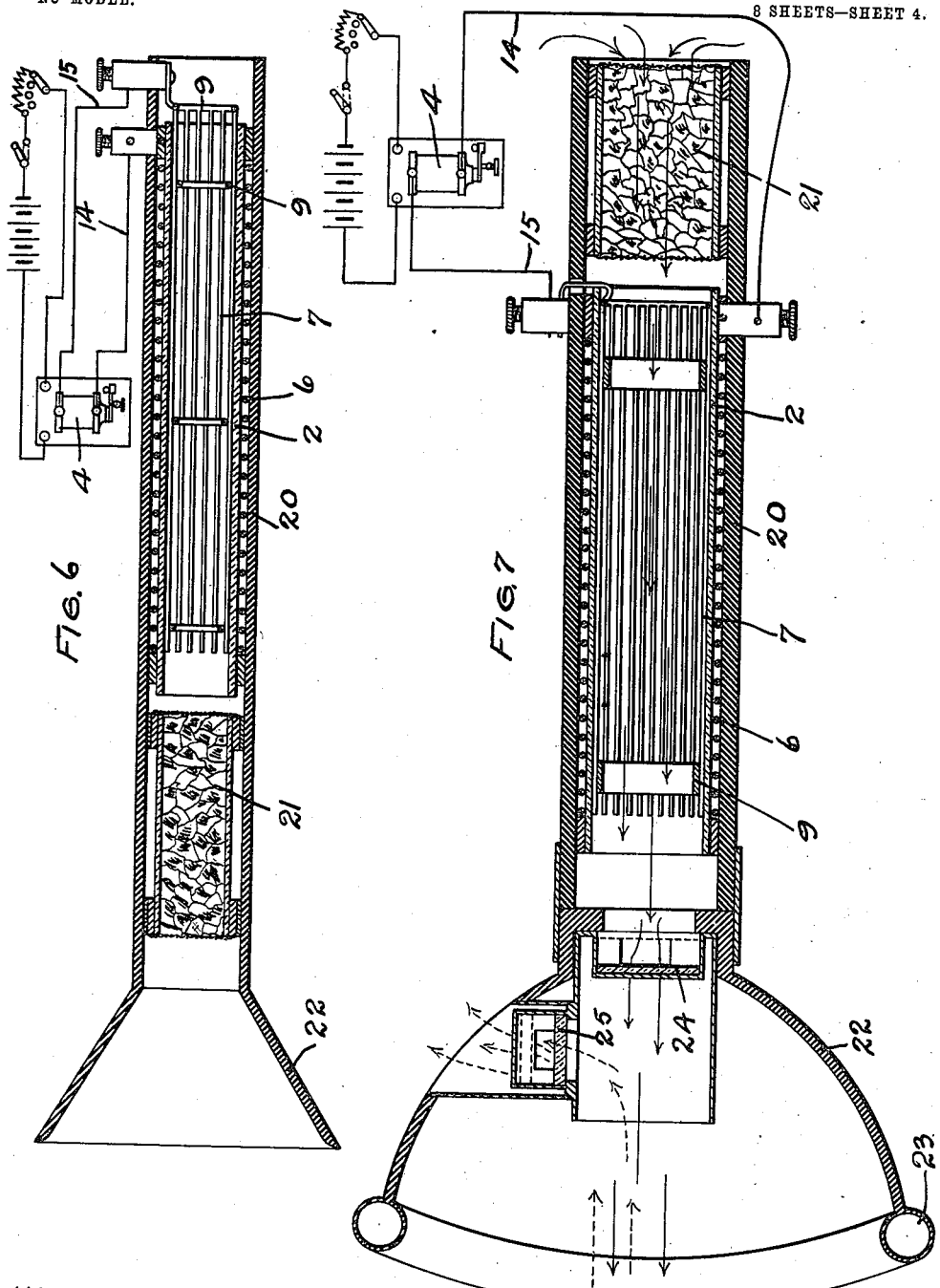

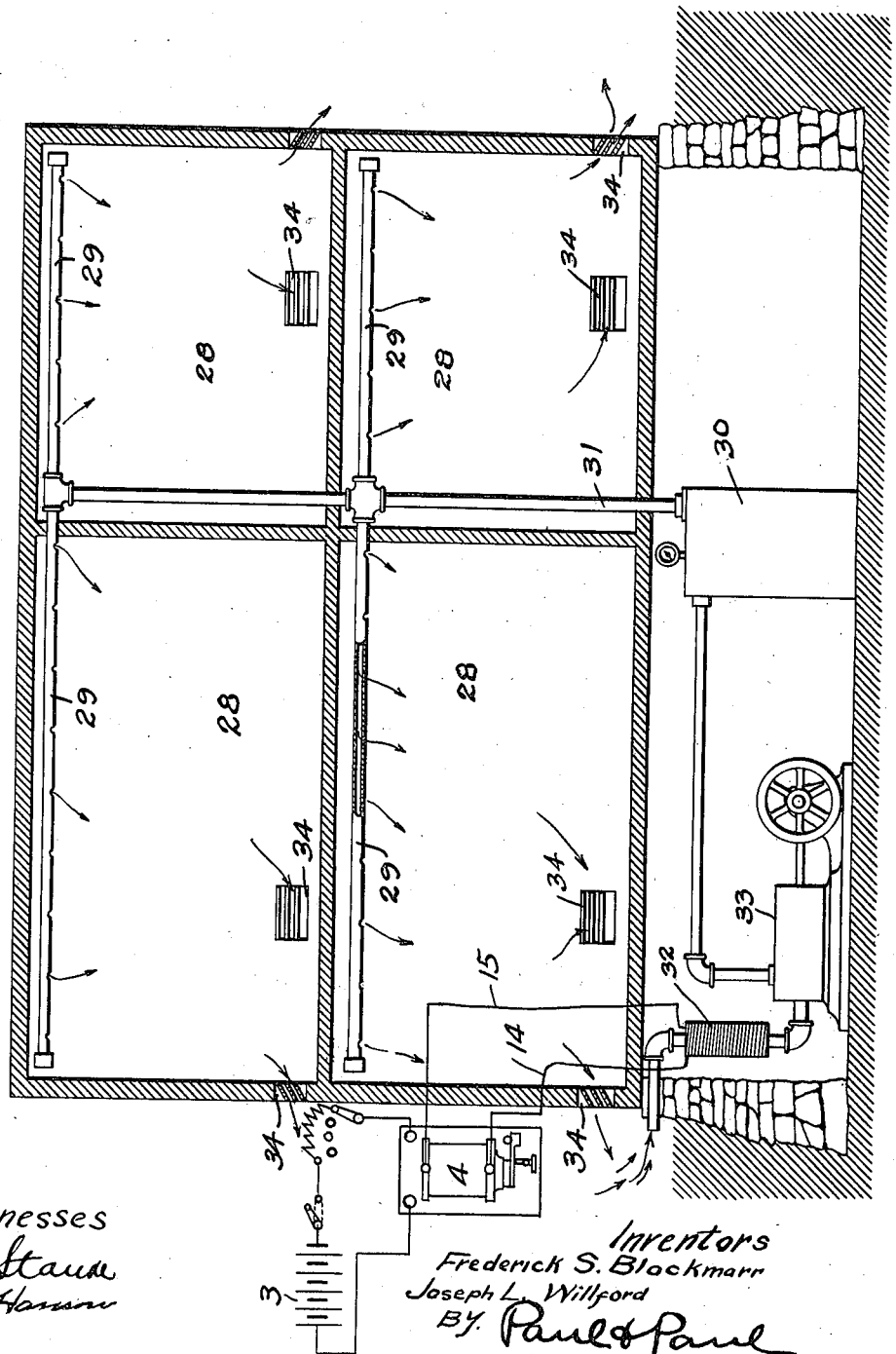

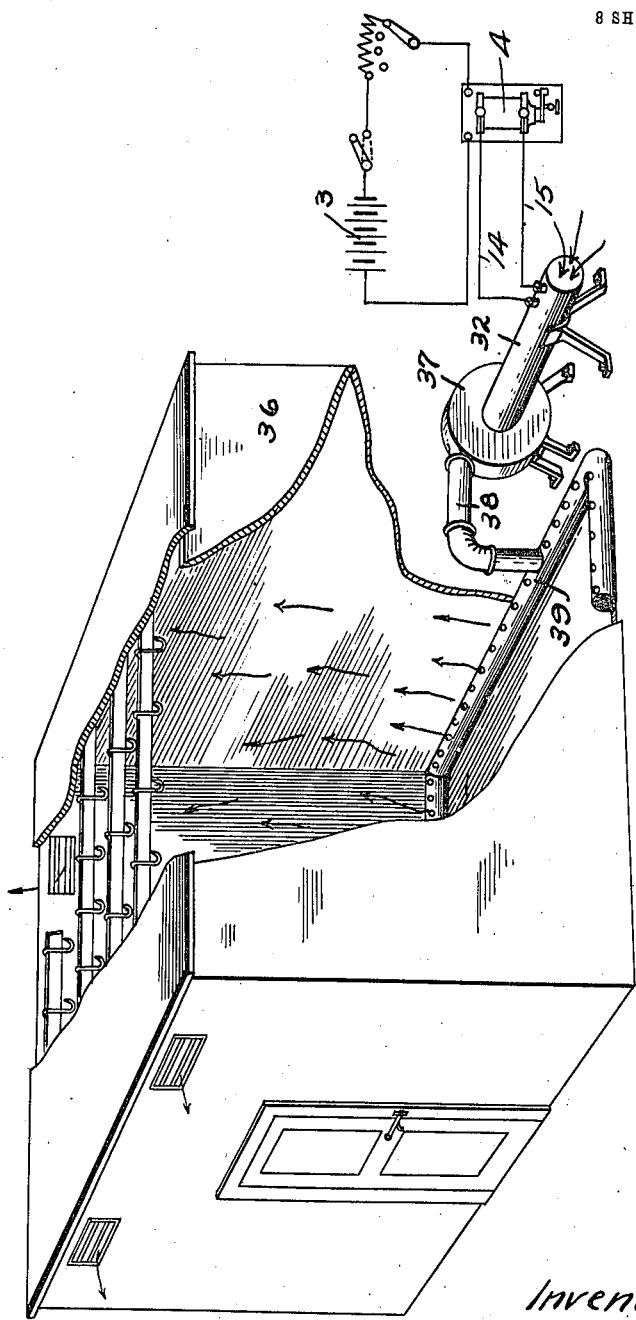

No. 743,432. PATENTED NOV. 10, 1903.
F. S. BLACKMARR & J. L. WILLFORD.
APPARATUS FOR CONVERTING OXYGEN INTO OZONE.
APPLICATION FILED APR. 26, 1902.
NO MODEL.
8 SHEETS—SHEET 7.
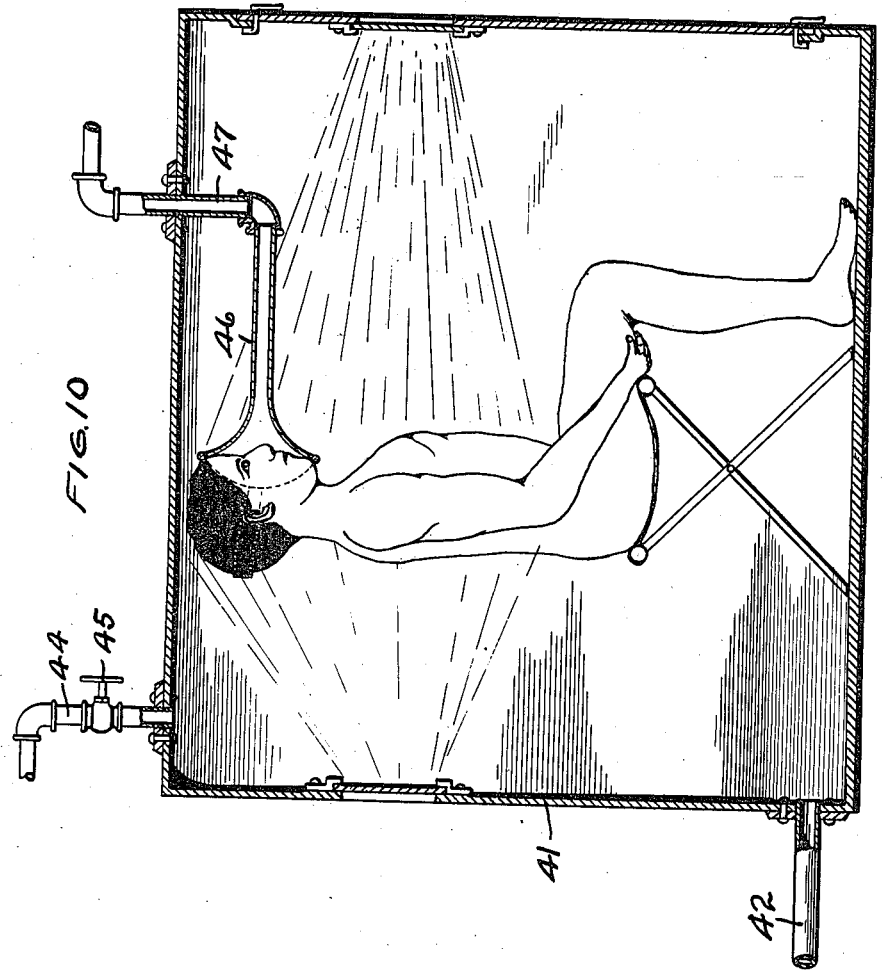
Witnesses
Inventors
Frederick S. Blackmarr
Joseph L. Willford
By Paul & Paul
Their attorneys

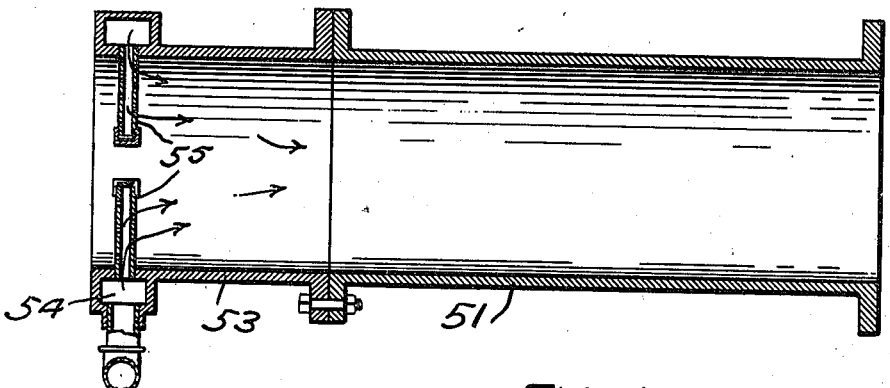
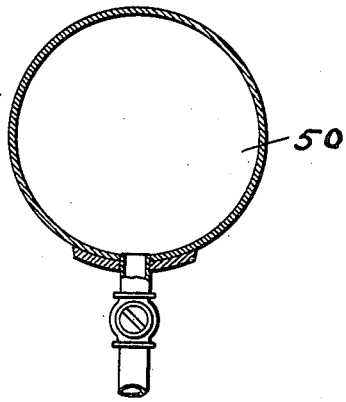
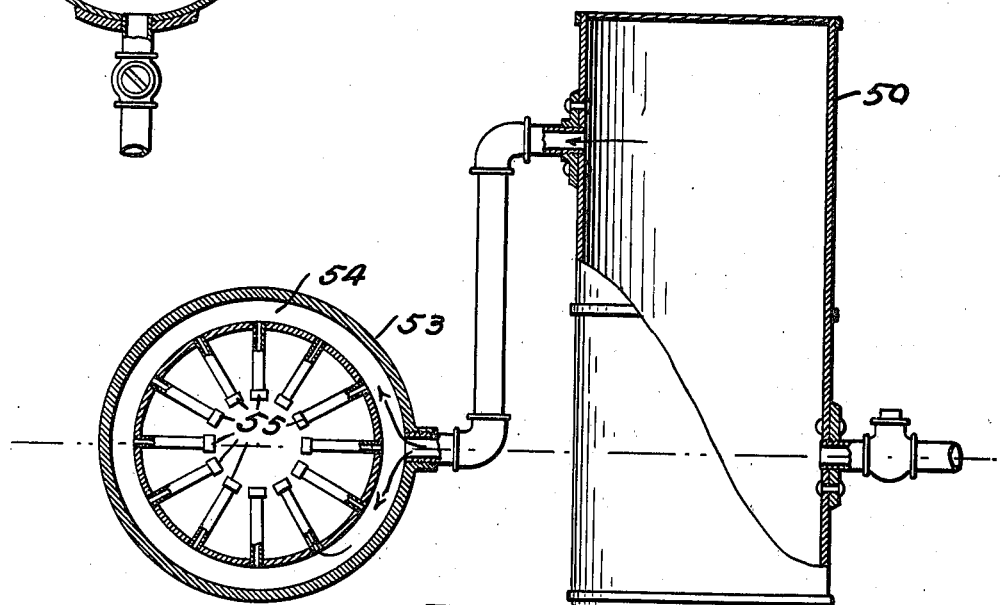

No. 743,432. Patented November 10, 1903.

UNITED STATES PATENT OFFICE.

FREDERICK S. BLACKMARR AND JOSEPH L. WILLFORD, OF MINNEAPOLIS, MINNESOTA.

APPARATUS FOR CONVERTING OXYGEN INTO OZONE.

SPECIFICATION forming part of Letters Patent No. 743,432, dated November 10, 1903.

Application filed April 26, 1902. Serial No. 104,829. (No model.)

*To all whom it may concern:*

Be it known that we, FREDERICK S. BLACKMARR and JOSEPH L. WILLFORD, both of Minneapolis, Hennepin county, Minnesota, have invented certain new and useful Improvements in Apparatus for Converting Oxygen into Ozone, of which the following is a specification.

Our invention relates to improvements in apparatus for converting oxygen into ozone; and the object we have in view is to provide an apparatus by which this result can be secured without the production of sparks or heat, thereby avoiding the production of oxids.
The invention consists generally in the constructions and combinations hereinafter described, and particularly pointed out in the claims.

Figure 5:
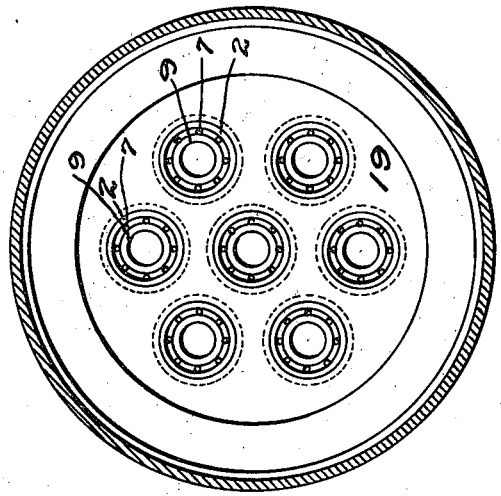
Figure 4:
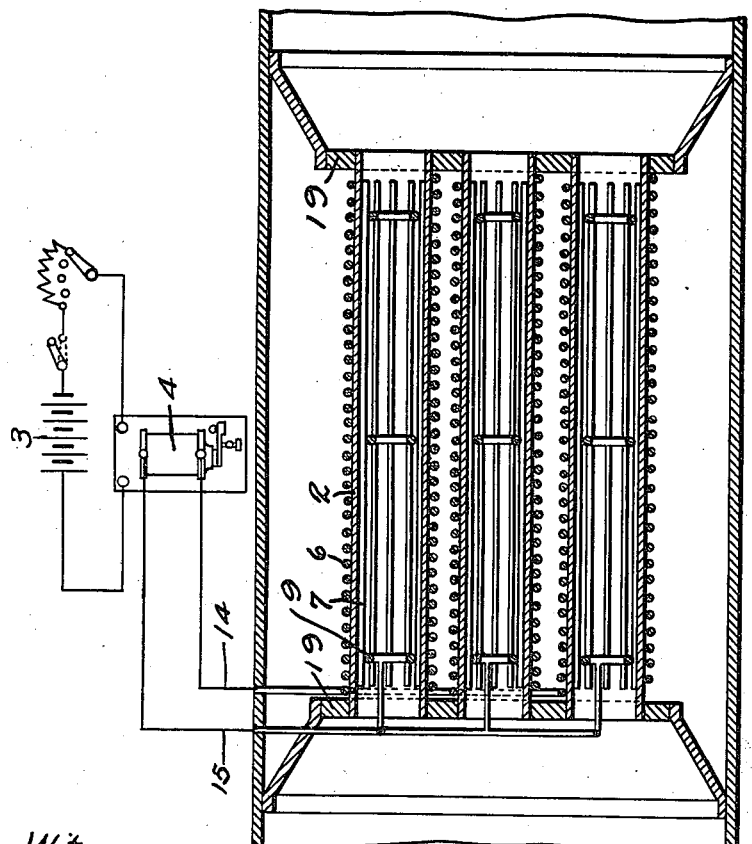

In the accompanying drawings, forming part of this specification, Figure 1 is a plan view of our apparatus. Fig. 2 is a longitudinal section of the converter. Fig. 3 is a perspective view, partly in section, of the converter. Fig. 4 is a longitudinal section showing the modified construction of the converter. Fig. 5 is a transverse section of the converter shown in Fig. 4. Fig. 6 is a longitudinal section of an inhaler embodying our invention. Fig. 7 is a similar view of an inhaler provided with controlling-valves permitting the air to be drawn through the converter and expelled through an opening at the side of the mouthpiece. Fig. 8 shows the invention applied to a ventilating system. Fig. 9 illustrates the manner of applying the invention to a storage-house. Fig. 10 illustrates the manner of applying the invention to a bath-cabinet. Figs. 11 and 12 show the invention applied to the ozonizing of water.
In carrying out our invention we provide a wall of any dielectric substance, such as glass, mica, earthenware, lava, vulcanized rubber, or any other suitable material. This wall may be in any suitable form. We prefer to construct it in the form of a glass tube 2 having open ends.

3 represents a suitable storage or other battery, or it may be an electric generator instead.

4 represents an ordinary induction-coil provided with a suitable circuit-breaker 5, said coil being in circuit with the battery 3.

The glass tube 2 is provided on its outer surface with a number of metallic coils 6 and upon its inner surface with a number of longitudinal wires 7. These two sets of wires are arranged one within and the other without the glass tube, and each set of wires rests against the surface of the glass, the inner wires being all preferably connected by the series of bands or coils 9. The wires upon the outer surface and the wires upon the inner surface of the glass tube form the terminals of the secondary electric circuit of the induction-coil, and the glass tube is a dielectric substance arranged between said terminals, so that we secure a passage of the electric current from one terminal to the other through the glass tube or wall. The fact that the terminals are in contact at all points with the tube or wall prevents any sparking of the electric current and causes a "glow" around the wires. We may provide any suitable means for passing oxygen or air through the converter-tube 2 or along the wall of the dielectric, and thus into the field of the glow produced by the discharge of electricity from the wire. We have here shown a suitable fan 10, arranged upon a casing 11, that is connected to one end of the converter 2. The fan 10 is driven, preferably, by a suitable electric motor 12, and said motor is connected to the battery 3 by suitable wires 13. This fan acts as an exhaust and draws a continuous stream of air through the tube. The air in the tube or cylinder is therefore under atmospheric pressure only, and a uniform quantity of oxygen is therefore brought within the influence of the electric current in any given quantity of time. We therefore produce a uniform quantity of ozone, and where air is drawn through the tube we produce ozonized air of uniform strength. Were the air forced into and through the tube by a blower, the air in the tube would be compressed whenever the discharge-orifice was closed or partially closed. This compression of the air would bring a larger quantity of oxygen within the influence of the electric current, and hence the ozonized air would be of greater strength or have a greater percentage of ozone in it. From the induction-coil 4 wires 14 and 15 extend to the terminals connected with the converter. The wire 14, as here shown, extends to the series of wires or coils 6, arranged upon the outside of the converter, and the wire 15 extends to the series of wires 7, arranged upon the inside of the converter. In some instances we prefer to provide within the converter a longitudinal shaft or rod 14', having its ends supported by suitable spiders 15'. The rod or shaft 14' has arranged upon it a number of disks 16, separated by glass or other suitable tubes 17. The wires upon the inner surface are substantially at right angles to the wires upon the outer surface, and by this arrangement of the wires the entire tube is uniformly subjected to the electric current and the influence of the current upon all parts of the inner surface of the tube is uniform. We thus secure a generator having a substantially uniform electric discharge over all portions of its inner surface.

The operation of the device is as follows: The wires upon the inner and outer surfaces of the glass tube constitute the terminals of the secondary circuit of the induction-coil 4. There is therefore an induced current through these wires and a passage of electricity from one terminal to the other through the dielectric material interposed between the terminals. As the wires are at all points in contact with the glass, both on the outside and the inside of the tube, there can be no sparking between the terminals, which always results when the terminals are not in contact with the interposed dielectric material. The production of sparks causes the formation of oxids, which mingled with the ozone or ozonized air produce a deleterious effect when inhaled, causing an irritation of the mucous membrane of the nasal passages, throat, and lungs. By means of the fan a current of air is drawn through the tube, and the oxygen of the air which is brought within the influence of the electric discharge from the inner terminal is converted into ozone. When the apparatus is in operation, there will be visible a distinct glow nearly or completely filling the tube. From the fan the ozonized air may be directed to any desired point of application. There are a large number of different applications of the ozone which may be made. We have illustrated in the accompanying drawings several practical applications of our apparatus.

In Figs. 6 and 7 we have shown the apparatus applied to an inhaler. This inhaler consists of a suitable tube 20, within which a generator similar to that already described is placed. A suitable filter 21 may be arranged within the tube of the inhaler, if preferred. The inhaler may also be provided with a suitable mouthpiece 22.

In Fig. 7 we have shown the tube 20 provided with a larger mouthpiece 22, adapted to cover both the mouth and nose of the user. This mouthpiece is provided with a flexible rim or edge 23. The inhaler is provided with the filter 21, and it is also provided with the valve 24, controlling the inlet of the ozonized air, and with a valve 25, permitting the escape of the air without having to pass back through the converter. With this construction the ozonized air is drawn through the converter and into the lungs of the user. As the air is expelled from the lungs the valve 24 closes and the valve 25 opens and permits the escape of the air, none of it passing backward through the converter.

In Fig. 8 we have shown the apparatus applied to a system of house ventilation. As here shown, 28 28 represent the rooms to be ventilated, and they are provided with suitable perforated inlet-pipes 29, connected with an air or gas tank by a suitable pipe 31. A generator (here represented at 32) may be of the same construction as that shown in Figs. 1 and 2 of the drawings. A suitable air pump or compressor 33 is arranged to draw the air through the converter 32 and force it into the tank 30, from which the ozonized air is passed through the pipes 31 and 29 to the various rooms to be ventilated. Openings 34 may be provided permitting the air to escape from the room.

In Fig. 9 we have shown our apparatus applied to a room for storing meats or other perishable articles. As here shown, 36 represents a suitable room, and 32 represents the converter, which is connected to a suitable fan-casing 37. From the fan-casing 37 a pipe 38 extends into the room and is connected to the perforated distributing-pipe 39. By this means the ozonized air may be distributed from the bottom of the room, and suitable openings may be provided for the escape of air at the upper part of the room. Meat or other perishable articles may be placed in this room and may be treated by the ozonized air forced into the room by the fan 37 from the converter 32, and by this means the meat or other articles will be indefinitely preserved.

In Fig. 10 we have shown a suitable cabinet 41, to which is connected a pipe 42, extending from the converter, with an escape-pipe 44, provided with a suitable controlling-valve 45. By this means with a suitable pump or compressor ozonized air may be forced into the cabinet 41 until any desired pressure is obtained. A person may be placed within this cabinet before the ozonized air is permitted to enter it and may remain therein until a high pressure of the ozonized air in the cabinet is obtained. We prefer to provide a mouthpiece 46 and tube 47, extending to the outside of the cabinet, permitting the person placed within the cabinet to breathe freely air from the outside of the cabinet.

In Figs. 11 and 12 we have shown our apparatus applied to the ozonizing of water.

As here shown, 50 represents a suitable tank or receptacle into which the ozonized air from the converter may be forced by a pump or other suitable means. 51 represents a water main or pipe, and 53 a short section connected to the pipe 51 and provided with the annular chamber 54. A series of short pipes 55 extend from this chamber toward the center of the main or service pipe. These short pipes are perforated, so as to permit the ozonized air to escape therefrom and to be freely distributed throughout the water passing through the pipe or main. The water thus passing through the pipe or main is thoroughly impregnated with the ozonized air, and by this means nearly all of the bacteria in the water will be destroyed. Scientific tests have shown that by this method ninety per cent. of the bacteria in the water passing through the pipe or main are destroyed.

In Figs. 4 and 5 of the drawings we have shown converters formed of a series of small tubes arranged within a single large tube and separated from each other by fiber disks 19. This is simply, however, another form of the converter and consists in duplicating the tubes and supporting a series of them within a single large tube.

While we have found the glass tube to be the most convenient form of converter, we do not limit ourselves to the use of any particular material or to any particular form of apparatus. Instead of using glass as the dielectric material between the terminals we may, as above stated, employ mica, earthenware, lava, vulcanized rubber, or any other suitable material. We have found, however, that a glass tube is of a more uniform density than the other materials mentioned and believe that the same will generally be found preferable for this purpose. We also prefer to employ German-silver wire for the conveyance of the electric current, although any other suitable conductor may be employed.

It is the aim of our apparatus to provide a greater quantity of oxygen than normal in any given volume of air. We do not attempt to diminish the nitrogen of the air; but by increasing the density of the oxygen we secure three parts of oxygen in place of two parts in the same volume of air. In other words, we convert three parts of oxygen into two parts of its allotropic form, (ozone,) and hence we increase the density of the oxygen and add to the amount that is in the air that is inhaled or used for other purposes. Ozone as we produce it is not a poisonous irritating gas; neither has it any more oxidizing properties than oxygen. It is a gas that may readily be breathed without deleterious effects, and it is very beneficial in cases of catarrhal and bronchial affections or of any diseases of the respiratory organs. It is also a germicide and disinfectant of great merit.

We do not limit ourselves to the specific applications of the ozone or ozonized air that we have illustrated here. By applying the process to pure oxygen the resulting gas will be pure ozone. By applying it to atmospheric air the resulting gas will be ozonized air.

We do not in this application make any claim to the process or method of converting oxygen into ozone, having claimed the same in a separate application, of even date herewith, Serial No. 104,828.

We claim as our invention—

1. An apparatus for converting oxygen into ozone, consisting of a tube or cylinder formed of a dielectric material, an induction-coil, and terminals for the secondary circuit of the induction-coil located upon the inner and outer surfaces of said tube or cylinder, each terminal being in contact at all points throughout its length with one surface of said tube or cylinder, and means for passing oxygen or air through said tube or cylinder and in contact with the inner terminal.

2. An apparatus for converting oxygen into ozone, comprising, in combination, a tube or cylinder formed of a suitable dielectric material, an induction-coil, one terminal for the secondary circuit of said coil being arranged upon the outer surface of said tube and the other terminal being a series of wires arranged within said tube or cylinder and in contact at all points throughout their length with the inner surface of said tube, means for drawing a current of air or oxygen through said cylinder, and a filter arranged at the inlet end of said cylinder and through which the air or oxygen is passed.

3. An apparatus for converting oxygen into ozone, comprising, in combination, a tube or cylinder formed of suitable dielectric material, an induction-coil, one terminal for the secondary circuit of said coil being arranged upon the outer surface of said tube and the other terminal being a series of wires arranged within said tube or cylinder and in contact at all points throughout their length with the inner surface of said tube, a fan for drawing a current of air through said cylinder, and means for operating said fan.

4. An apparatus for converting oxygen into ozone, comprising, in combination, a tube or cylinder formed of suitable dielectric material, an induction-coil, a series of wires arranged upon and in contact at all points throughout their length with the outer surface of said tube or cylinder and forming one terminal of the secondary circuit of said coil, a series of wires arranged upon and in contact at all points throughout their length with the inner surface of said tube or cylinder and forming the other terminal of said secondary circuit, and means for causing a current of air through said tube or cylinder.

5. An apparatus for converting oxygen into ozone, comprising, in combination, a tube or cylinder formed of suitable dielectric material, an induction-coil, a series of wires arranged upon and in contact at all points throughout their length with the outer surface of said cylinder and forming one terminal of the secondary circuit of said coil, a series of wires arranged upon and in contact with the inner surface of said cylinder and forming the other terminal of said secondary circuit, means for causing a current of air through said tube or cylinder, and deflectors arranged in said tube or cylinder and adapted to cause the air to pass along the wall of the tube or cylinder in proximity to said wires.

6. An apparatus for converting oxygen into ozone, comprising, in combination, a tube or cylinder formed of suitable dielectric material, an induction-coil, a series of wires arranged circumferentially upon and in contact at all points throughout their length with the outer surface of said tube or cylinder and forming one terminal of the secondary circuit, a series of wires arranged longitudinally upon and in contact at all points throughout their length with the inner surface of said tube or cylinder, and forming the other terminal of said secondary circuit, and means for passing air or oxygen through said tube or cylinder.

In witness whereof we have hereunto set our hands this 22d day of April, 1902.

FREDERICK S. BLACKMARR.
JOSEPH L. WILLFORD.

In presence of—
A. C. PAUL,
C. G. HANSON.